United States Patent
Schoemann

(10) Patent No.: US 7,066,532 B2
(45) Date of Patent: Jun. 27, 2006

(54) ULTRATHIN STRUCTURAL PANEL WITH RIGID INSERT

(75) Inventor: Michael P. Schoemann, Waterford, MI (US)

(73) Assignee: Lear Corporation, Southfield, MI (US)

( * ) Notice: Subject to any disclaimer, the term of this patent is extended or adjusted under 35 U.S.C. 154(b) by 75 days.

(21) Appl. No.: 10/292,669

(22) Filed: Nov. 12, 2002

(65) Prior Publication Data

US 2004/0115420 A1 Jun. 17, 2004

(51) Int. Cl.
B60J 7/00 (2006.01)

(52) U.S. Cl. .............................. 296/193.07; 296/37.14; 296/37.3

(58) Field of Classification Search ............. 428/304.4, 428/68, 76; 52/309.4, 309.7, 309.8, 309.9, 52/309.15, 309.16; 296/193.07
See application file for complete search history.

(56) References Cited

U.S. PATENT DOCUMENTS

| | | | | |
|---|---|---|---|---|
| 1,434,350 A | * | 10/1922 | Collins | 296/37.7 |
| 3,338,620 A | * | 8/1967 | Cauvin | 296/37.14 |
| 3,470,058 A | * | 9/1969 | Heffner | 428/119 |
| 4,035,458 A | | 7/1977 | Lyman | |
| 4,142,757 A | * | 3/1979 | Fogle et al. | 296/63 |
| 4,587,272 A | | 5/1986 | Avakian et al. | |
| 4,675,231 A | | 6/1987 | Kia | |
| 4,801,483 A | * | 1/1989 | Beckerman et al. | 428/117 |
| 4,860,415 A | | 8/1989 | Witzke | |
| 4,863,994 A | | 9/1989 | Nelson et al. | |
| 4,868,223 A | | 9/1989 | Nelson et al. | |
| 4,876,127 A | | 10/1989 | Khanna et al. | |
| 4,971,857 A | * | 11/1990 | Taggart | 428/304.4 |
| 5,011,347 A | * | 4/1991 | Bullock | 410/9 |
| 5,046,434 A | * | 9/1991 | Breezer et al. | 108/57.27 |
| 5,056,858 A | * | 10/1991 | Tanaka | 296/37.3 |
| 5,061,002 A | * | 10/1991 | Saso | 296/37.14 |
| 5,196,151 A | | 3/1993 | Sakaida et al. | |
| 5,245,141 A | * | 9/1993 | Fortez et al. | 181/288 |
| 5,257,846 A | * | 11/1993 | Kanai et al. | 296/37.14 |
| 5,412,024 A | | 5/1995 | Okada et al. | |
| 5,441,183 A | * | 8/1995 | Frenzel | 224/542 |
| 5,544,998 A | * | 8/1996 | Malinowski | 296/26.09 |
| 5,568,890 A | * | 10/1996 | Magee et al. | 296/37.6 |
| 5,599,608 A | | 2/1997 | Yamamoto et al. | |
| 5,636,890 A | * | 6/1997 | Cooper | 296/37.14 |
| 5,792,552 A | * | 8/1998 | Langkamp et al. | 428/309.9 |

(Continued)

Primary Examiner—Kiran B. Patel
(74) Attorney, Agent, or Firm—MacMillan, Sobanski & Todd, LLC

(57) ABSTRACT

An ultrathin covered structural panel includes a panel body made from a relatively lightweight moldable material such as expanded polypropylene (EPP), expanded polystyrene (EPS), expanded polypropylene with added strengtheners (XPP), polystyrene/polyphenylene ether (GECET®) foam, polyurethane foam, polystyrene foam, fiberglass materials, glass fiber-reinforced polypropylene (Azdel® composites), or treated reclaimed cellulose. The structural panel also includes one or more rigid high-strength structural inserts in the interior of the panel body. The structural panel further includes a covering on at least one side of the panel body. The structural panel is not more than about 20 mm thick. In a method of making the structural panel, one or more rigid high-strength structural inserts are placed into the cavity of a mold. The mold cavity has the shape of the structural panel and has a thickness of not more than about 20 mm. The mold is closed. A relatively lightweight moldable material is introduced into the mold cavity so that the moldable material surrounds the insert(s) and fills the mold cavity. The moldable material is allowed to harden to form the structural panel, and the finished structural panel is removed from the mold.

7 Claims, 8 Drawing Sheets

U.S. PATENT DOCUMENTS

| | | |
|---|---|---|
| 5,799,845 A * | 9/1998 | Matsushita ................. 296/37.2 |
| 5,842,730 A * | 12/1998 | Schneider et al. ........ 296/37.16 |
| 5,945,132 A * | 8/1999 | Sullivan et al. ............. 425/143 |
| 5,979,725 A * | 11/1999 | Lehrman .................... 224/539 |
| 5,979,962 A * | 11/1999 | Valentin et al. ............ 296/39.3 |
| 5,983,584 A * | 11/1999 | Staten et al. ............... 52/309.8 |
| 6,015,071 A * | 1/2000 | Adomeit et al. ......... 224/42.34 |
| 6,033,003 A * | 3/2000 | Bell et al. ................... 296/37.3 |
| 6,045,731 A | 4/2000 | Matsuoka |
| 6,050,202 A * | 4/2000 | Thompson ............... 296/37.16 |
| 6,070,378 A * | 6/2000 | Dumlao et al. ................ 52/263 |
| 6,071,591 A | 6/2000 | Dausch |
| 6,120,100 A | 9/2000 | Palazzolo et al. |
| 6,136,259 A * | 10/2000 | Puffenberger et al. ..... 296/37.3 |
| 6,155,625 A * | 12/2000 | Felix ...................... 296/37.14 |
| 6,176,535 B1 * | 1/2001 | Chaloult et al. ......... 296/37.16 |
| 6,205,728 B1 * | 3/2001 | Sutelan ...................... 52/309.7 |
| 6,210,613 B1 | 4/2001 | Stein et al. |
| 6,247,741 B1 * | 6/2001 | Seel et al. ................. 296/37.14 |
| 6,247,747 B1 * | 6/2001 | Kawanomoto et al. ..... 296/191 |
| 6,253,943 B1 * | 7/2001 | Spykerman et al. ........ 224/539 |
| 6,290,278 B1 * | 9/2001 | Loveland ................... 296/37.3 |
| 6,312,034 B1 * | 11/2001 | Coleman et al. ........... 296/26.1 |
| 6,334,969 B1 | 1/2002 | Hosokawa |
| 6,338,518 B1 * | 1/2002 | D'Annunzio et al. .... 296/37.14 |
| 6,398,995 B1 | 6/2002 | Eisenlord et al. |
| 6,447,039 B1 | 9/2002 | Song |
| 6,467,829 B1 * | 10/2002 | Kaluszka et al. .......... 296/37.3 |
| 6,482,508 B1 * | 11/2002 | Persson et al. .......... 428/304.4 |
| 6,505,874 B1 * | 1/2003 | Ando et al. .............. 296/37.16 |
| 6,644,709 B1 * | 11/2003 | Inagaki et al. ........... 296/37.14 |
| 6,695,380 B1 * | 2/2004 | Hicks ...................... 296/37.14 |
| 6,719,348 B1 * | 4/2004 | Song ....................... 296/37.14 |
| 6,733,060 B1 * | 5/2004 | Pavkov et al. ........... 296/37.16 |
| 6,739,673 B1 * | 5/2004 | Gupta et al. ........... 297/452.65 |
| 6,742,823 B1 * | 6/2004 | Guanzon et al. ......... 296/37.14 |
| 6,793,261 B1 * | 9/2004 | McLeod et al. ........... 296/37.2 |
| 6,824,851 B1 * | 11/2004 | Locher et al. ........... 156/306.9 |
| 6,874,667 B1 * | 4/2005 | Dykstra et al. ............. 224/498 |
| 6,883,851 B1 * | 4/2005 | McClure et al. ......... 296/37.14 |
| 6,890,015 B1 * | 5/2005 | Carlsson et al. ......... 296/37.14 |
| 6,926,348 B1 * | 8/2005 | Krueger et al. .......... 296/37.14 |
| 2002/0007694 A1 | 1/2002 | Moc |
| 2002/0017733 A1 | 2/2002 | Kobayashi et al. |
| 2002/0022423 A1 | 2/2002 | Kroening et al. |
| 2004/0105744 A1 * | 6/2004 | Warner et al. .............. 414/522 |
| 2004/0256427 A1 * | 12/2004 | Settelmayer et al. ........ 224/319 |
| 2005/0156445 A1 * | 7/2005 | Mains ..................... 296/37.16 |

* cited by examiner

EPP BEADS
CHARGED

ULTRATHIN STRUCTURAL PANEL WITH RIGID INSERT

BACKGROUND OF THE INVENTION

This invention relates in general to structural panels, and in particular to load floors for automotive vehicles.

Automotive vehicles often include load floors to support cargo loads on the vehicles. The load floors must be very strong to support heavy loads. In the past, the load floors have been made from relatively thick materials, and usually heavy materials, to provide adequate strength.

Different types of vehicle load floors are disclosed in the following patents: U.S. Pat. No. 5,544,998 to Malinowski, U.S. Pat. No. 5,979,962 to Valentin et al., and U.S. Pat. No. 6,136,259 to Puffenberger et al. However, there is no suggestion in the patents to make a thin, lightweight load floor.

U.S. Pat. No. 6,210,613 B1 to Stein et al. discloses a method of molding a door trim panel assembly using expanded polypropylene. U.S. Patent Application Publication No. 2002/0022423 A1 to Kroening et al. discloses a method of molding a seat cushion with an elastic insert surrounded by an expandable foamed plastic. These patents are unrelated to structural panels such as load floors.

BRIEF SUMMARY OF THE INVENTION

This invention relates to an ultrathin covered structural panel. The structural panel includes a panel body made from a lightweight moldable material selected from expanded polypropylene (EPP), expanded polystyrene (EPS), expanded polypropylene with added strengtheners (XPP), polystyrene/polyphenylene ether (GECET®) foam, polyurethane foam, polystyrene foam, fiberglass materials, glass fiber-reinforced polypropylene (Azdel® composites), treated reclaimed cellulose, or mixtures thereof. The structural panel also includes one or more rigid high-strength structural inserts in the interior of the panel body. The structural panel further includes a covering on at least one side of the panel body. The structural panel is not more than about 20 mm thick.

In a preferred embodiment, the invention relates to an ultrathin load floor for an automotive vehicle. The load floor includes a load floor body made from a relatively lightweight moldable material, and one or more rigid high-strength structural inserts in the interior of the load floor body. The load floor is not more than about 20 mm thick.

The invention also relates to a method of making an ultrathin structural panel. One or more rigid high-strength structural inserts are placed into the cavity of a mold. The mold cavity has the shape of the structural panel and has a thickness of not more than about 20 mm. The mold is closed. A relatively lightweight moldable material is introduced into the mold cavity so that the moldable material surrounds the insert(s) and fills the mold cavity. The moldable material is allowed to harden to form the structural panel, and the finished structural panel is removed from the mold.

Various advantages of this invention will become apparent to those skilled in the art from the following detailed description of the preferred embodiments, when read in light of the accompanying drawings.

DETAILED DESCRIPTION OF THE INVENTION

Figure 1:
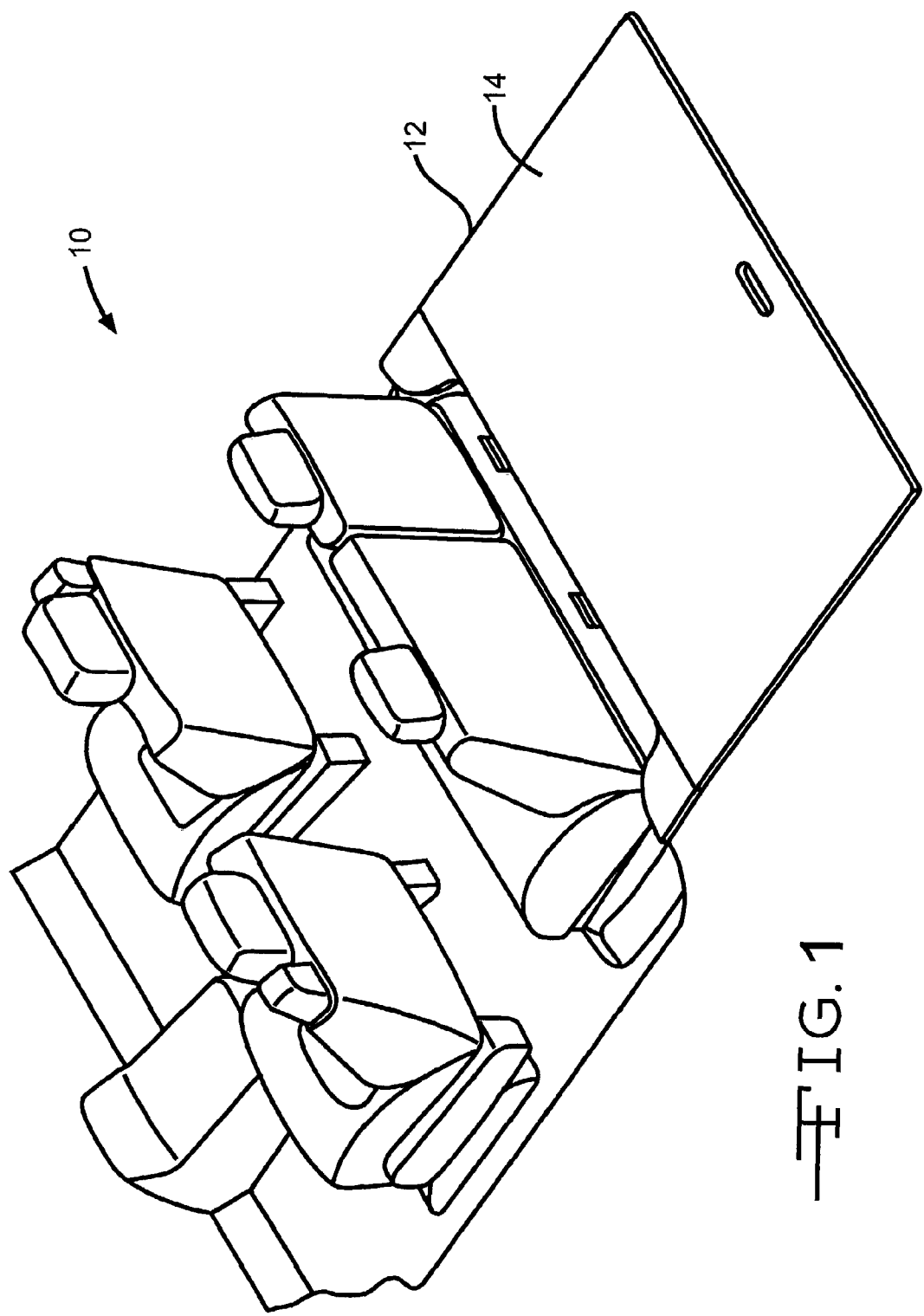
FIG. 1 is a perspective view of part of the interior of an automotive vehicle including an ultrathin load floor in accordance with the present invention.

This ultrathin structural panel of the invention can be any type of load-bearing panel. In a preferred embodiment, the structural panel is a load floor for an automotive vehicle. The load floor can be any type for use in supporting cargo loads at any location on a vehicle. FIG. 1 illustrates part of the interior 10 of an automotive vehicle including an ultrathin load floor 12 in accordance with the invention.

The structural panel includes a panel body that comprises a major portion of the panel. In the illustrated embodiment, the load floor 12 includes a load floor body 14. The panel body is made from a relatively lightweight moldable material. Preferably, the material has a density of not greater than about 10 pcf (pounds per cubic feet). In some preferred embodiments, the panel body is made from an expanded or foamed polymer. Nonlimiting examples of such polymers include expanded polypropylene (EPP), expanded polystyrene (EPS), expanded polypropylene with added strengtheners through its catalyst package (XPP), GECET® (polystyrene/polyphenylene ether) foam, polyurethane foam, and polystyrene foam. Most preferably, the panel body is made from expanded polypropylene. Expanded polypropylene beads are usually produced by adding catalysts and blowing agents to the base polypropylene beads and processing the beads through a pressurized reactor. The beads will expand to a predetermined size but a reduced density. Other nonlimiting examples of materials that can be used include fiberglass materials, Azdel® composites (glass fiber-reinforced polypropylene), and treated reclaimed cellulose.

Figure 2:
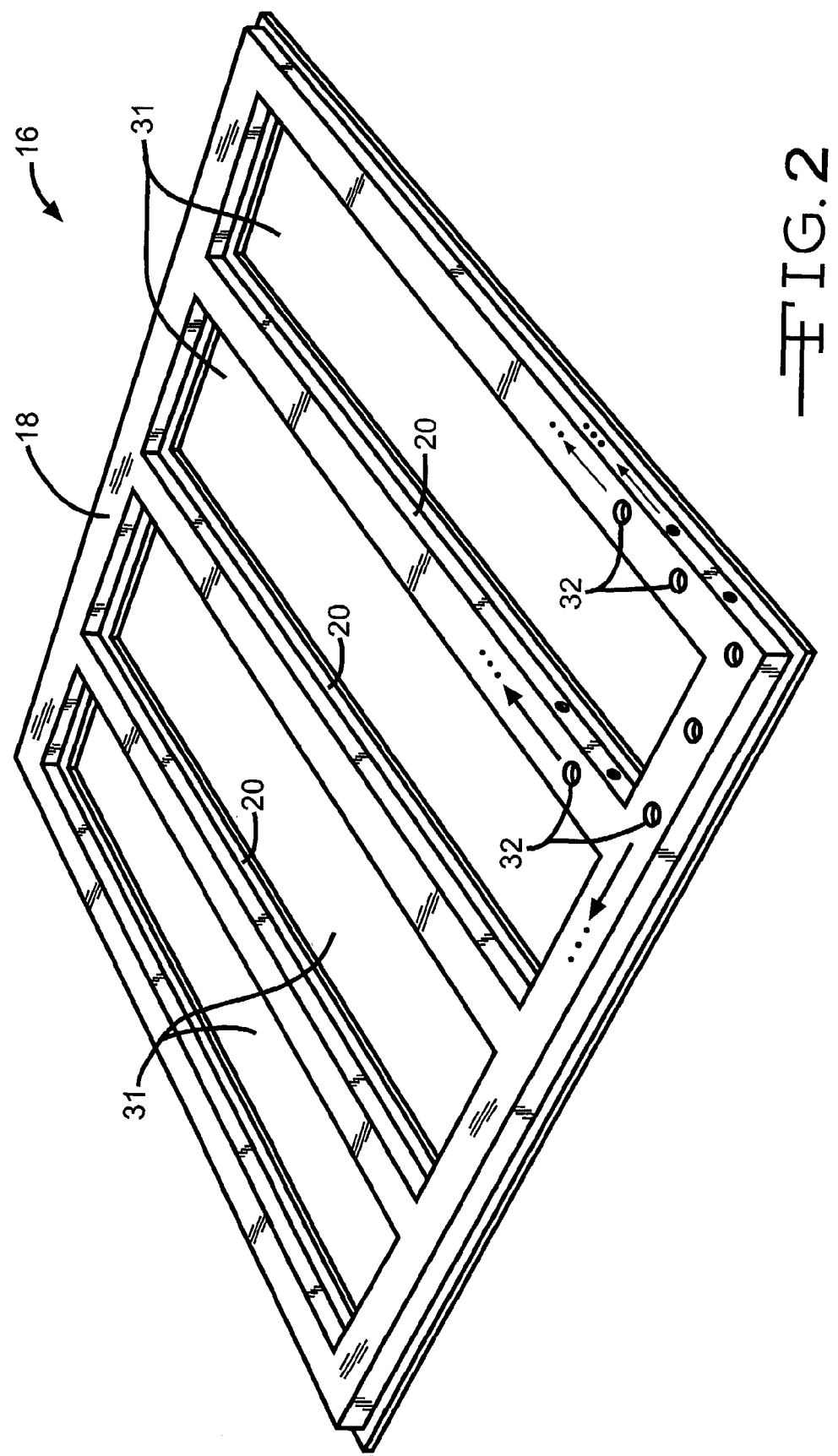
FIG. 2 is a perspective view of a structural insert that forms the skeleton of the load floor of FIG. 1.

The structural panel also includes one or more rigid, high-strength structural inserts or skeletons in the interior of the panel body. FIG. 2 illustrates an example of a structural insert 16 that can form the skeleton of the load floor 12 of FIG. 1. The insert enables the production of a structural panel that is ultrathin yet very strong to support heavy loads. The structural panel is typically not more than about 20 mm thick, preferably between about 5 mm and about 15 mm, and more preferably between about 10 mm and about 15 mm. The structural panel typically can support a point source load of at least about 100 lbs. without deflecting more than about 3 millimeters, and preferably at least about 250 lbs. The structural panel typically can support a distributed load of at least about 250 lbs. without deflecting more than about 3 millimeters, and preferably at least about 400 lbs. The deflection by a point source load is measured using a structural panel having dimensions of 36 inches by 48 inches by 15 mm, supporting only the opposite ends of the panel, and then placing the load at various points of the panel and measuring the deflection. The deflection by a distributed load is measured by placing equal weights distributed evenly about the outer edges of the panel.

Figure 6:
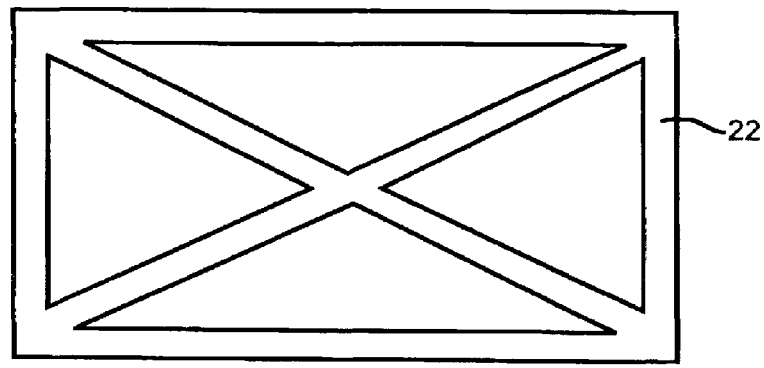
FIG. 6 is a plan view of another embodiment of a structural insert for use in the load floor of the invention.
Figure 7:
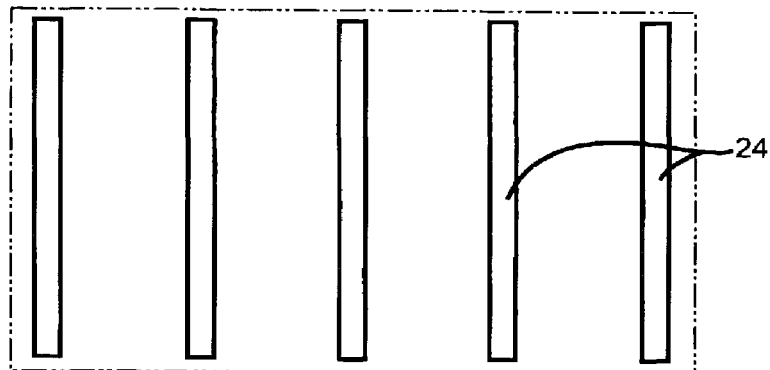
FIG. 7 is a plan view of an embodiment of a plurality of structural inserts for use in the load floor of the invention.

In the embodiment illustrated in FIGS. 1 and 2, the load floor 12 includes a single insert 16 in the interior of the load floor body 14. The structural insert can be configured and dimensioned in any manner suitable for providing load-bearing support to the structural panel. The insert 16 shown in FIG. 2 is rectangular in shape, including an outer frame 18 and three crossbeams 20 extending between opposite sides of the frame. The frame 18 is approximately the same size as the load floor body 14 so that the insert 16 provides support across the entire area of the load floor 12. FIG. 6 illustrates another embodiment of a structural insert 22 for use in a load floor in accordance with the invention. FIG. 7 illustrates an embodiment in which a plurality of structural inserts 24 are used in the load floor.

Figure 8:
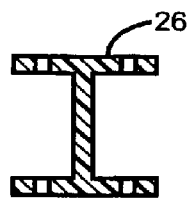
FIG. 8 is a cross-sectional view of another embodiment of a structural insert for use in the load floor of the invention.
Figure 9:
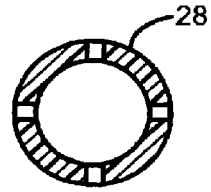
FIG. 9 is a cross-sectional view of another embodiment of a structural insert for use in the load floor of the invention.
Figure 10:
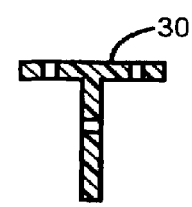
FIG. 10 is a cross-sectional view of another embodiment of a structural insert for use in the load floor of the invention.

The structural insert can have any type of cross-section suitable for providing load-bearing support to the structural panel. Some nonlimiting examples of cross-sections that may be suitable include rectangular, square, circular, C-shaped, hat-shaped, L-shaped, I-shaped and T-shaped. FIG. 8 shows a structural insert 26 having an I-shaped cross-section, FIG. 9 shows an insert 28 having a circular cross-section, and FIG. 10 shows an insert 30 having a T-shaped cross-section.

The structural insert is configured so that the moldable material can flow substantially uninterrupted through and/or around the insert and completely fill the mold. The structural insert 16 shown in FIG. 2 allows the moldable material to flow through the openings 31 between the crossbeams 20. Preferably, the structural insert 16 has a plurality of holes 32 through the insert. The holes allow the moldable material to flow through the holes and extend on each side of the insert, thereby locking the moldable material to the insert and producing a very strong, integral structure.

The structural insert can be made from any type of rigid, high-strength material suitable for providing load-bearing support to the structural panel. Some nonlimiting examples of materials that may be suitable include metals such as steel or aluminum, metal alloys, strong polymeric materials such as polycarbonate, acrylonitrilebutadiene-styrene copolymer (ABS), polypropylene, polypropylene, polyurethane, SRIM (structural reaction injection molded urethane), filled polymers (e.g., with talc), reinforced polymers (e.g., with glass fibers), such as Azdel® composites that consist of glass fiber-reinforced polypropylene, and high-strength wood or other high-strength natural material. The structural insert can be formed by any suitable method, such as by injection molding or compression molding a polymeric material.

Figure 11:
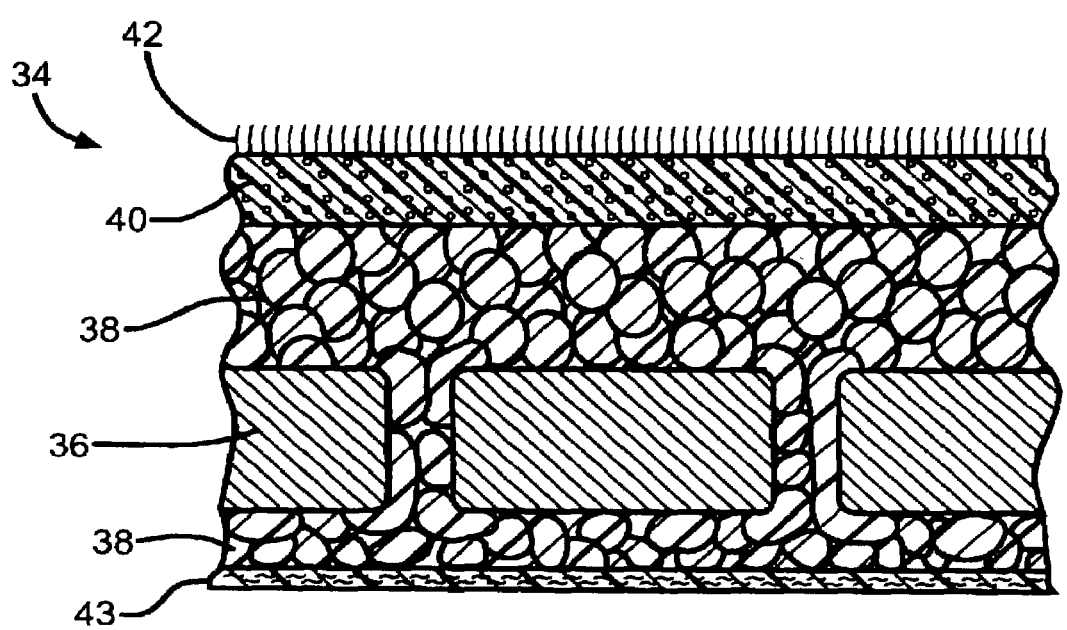
FIG. 11 is a side view in cross-section of a portion of an ultrathin load floor in accordance with the invention.

The structural panel can also include a covering that covers both sides, or at least one side, of the panel body. Preferably, the structural panel includes at least a covering for its show surface. Any type of relatively attractive and durable material can be used as the covering for the show surface, including but not limited to carpet, leather, vinyl, cloth, thermoplastic polyolefin, Masolite®, or Santaprene®. The show surface covering can include multiple layers of material, such as a cushion material (e.g., a flexible foam) adjacent to the panel body and a show material over the cushion material. FIG. 11 illustrates a structural panel 34 including a structural insert 36 in the interior of the panel, a panel body 38 made from expanded polypropylene, a cushion material 40 covering the panel body, and a carpet 42 on the surface of the panel. The structural panel can also include a covering for the non-show surface (not shown) made from any suitable material. Typically, the non-show covering is made from a less expensive material such as a scrim, e.g., a cotton fiber scrim or fiberglass scrim 43.

Figure 3:
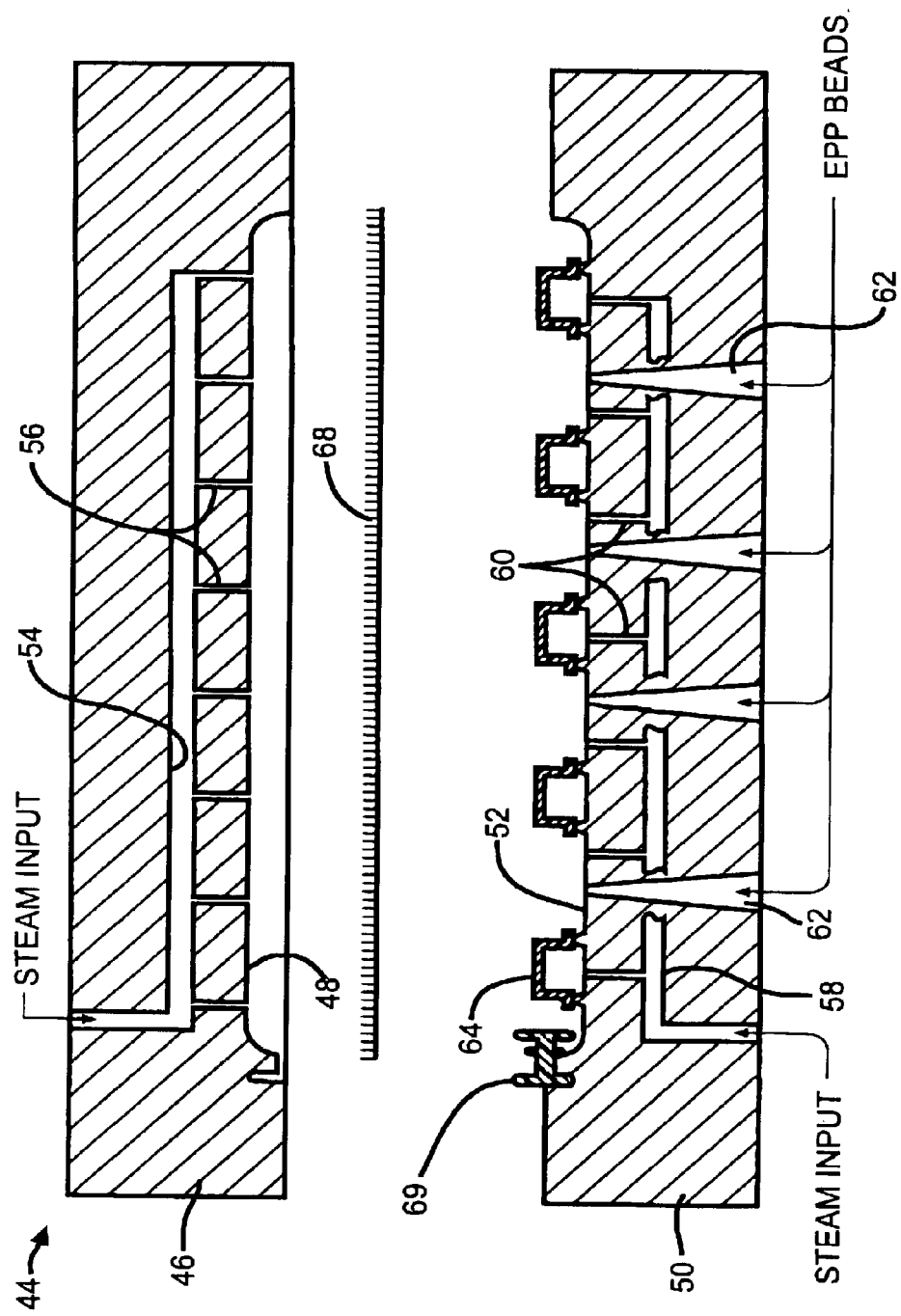
FIG. 3 is a side view in cross-section of a mold apparatus used in a preferred process according to the invention for making the load floor of FIG. 1.

The invention also relates to a method of molding an ultrathin load floor for an automotive vehicle. Any type of apparatus suitable for molding the load floor can be used, such as a suitable injection molding or compression molding apparatus. FIG. 3 shows an example of a mold apparatus 44 that can be used for making the load floor. The mold apparatus 44 includes an upper mold piece 46 having an inner recess 48, and a lower mold piece 50 having a corresponding inner recess 52. When the upper and lower mold pieces 46 and 50 are brought together, the recesses 48 and 52 combine to form the mold cavity. The mold cavity has the shape of the load floor and has a thickness of not more than about 20 mm.

Figure 4:
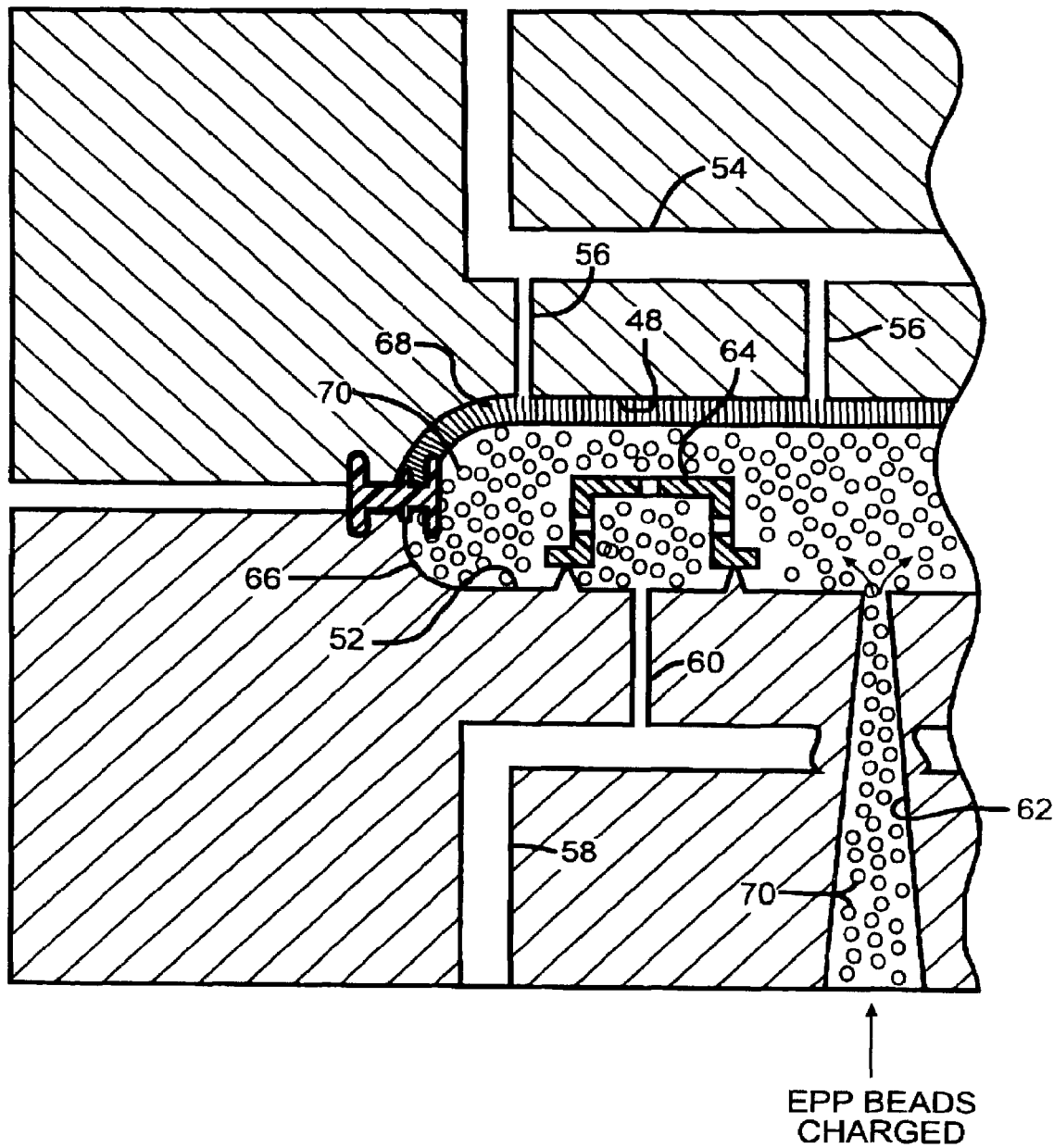
FIG. 4 is an enlarged cross-sectional view of a portion of the mold apparatus of FIG. 3, showing beads of expanded polypropylene being introduced into the mold cavity around the structural insert.
Figure 12:
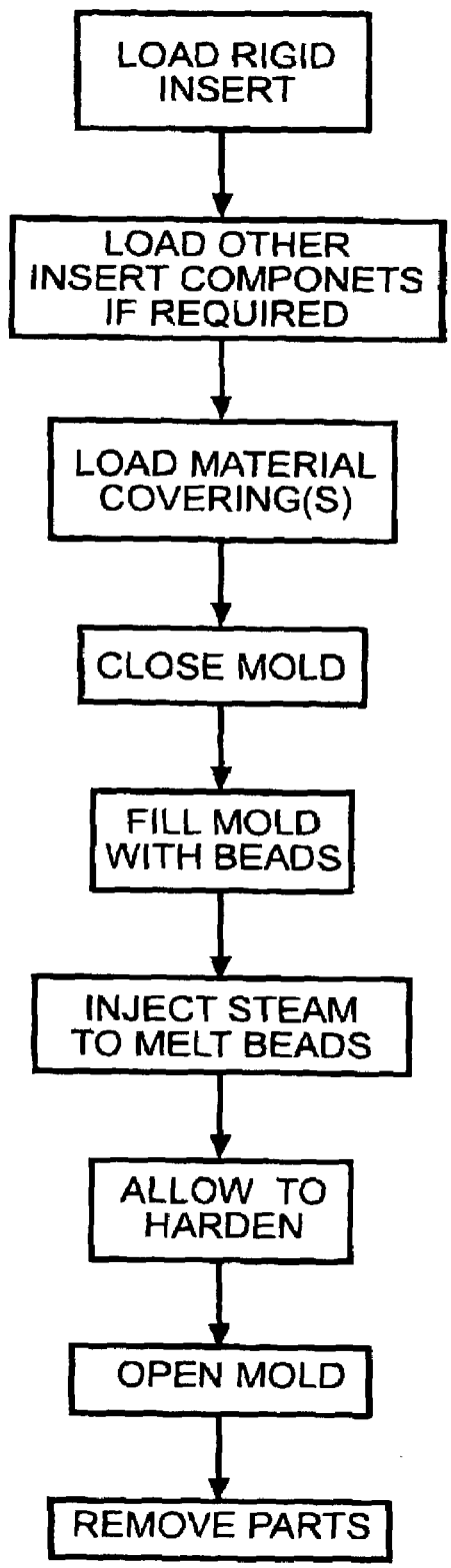
FIG. 12 is a flow chart of a preferred method of making an ultrathin load floor in accordance with the invention.

FIG. 12 is a flow chart of a preferred method of molding the ultrathin load floor. In an initial step of the method, a rigid high-strength structural insert is placed into the mold cavity. FIG. 3 shows the structural insert 64 having been placed into the recess 52 of the lower mold piece 50, and FIG. 4 shows the insert 64 inside the mold cavity 66 defined by the upper and lower recesses 48 and 52. Preferably, a covering for the load floor is also placed into the mold cavity, either before or after placing the insert into the cavity. The coverings can also be post-applied. FIG. 3 shows a carpet covering 68 for the load floor positioned between the upper and lower mold pieces 46 and 50, and FIG. 4 shows the covering 68 positioned adjacent to the upper recess 48 inside the mold cavity 66. Other inserted components 69 can be added at this time, for example, components that serve a function as part of a vehicle load floor, such as bungee cord tie-downs, grocery hooks, positive panel locators, or pegs.

Figure 5:
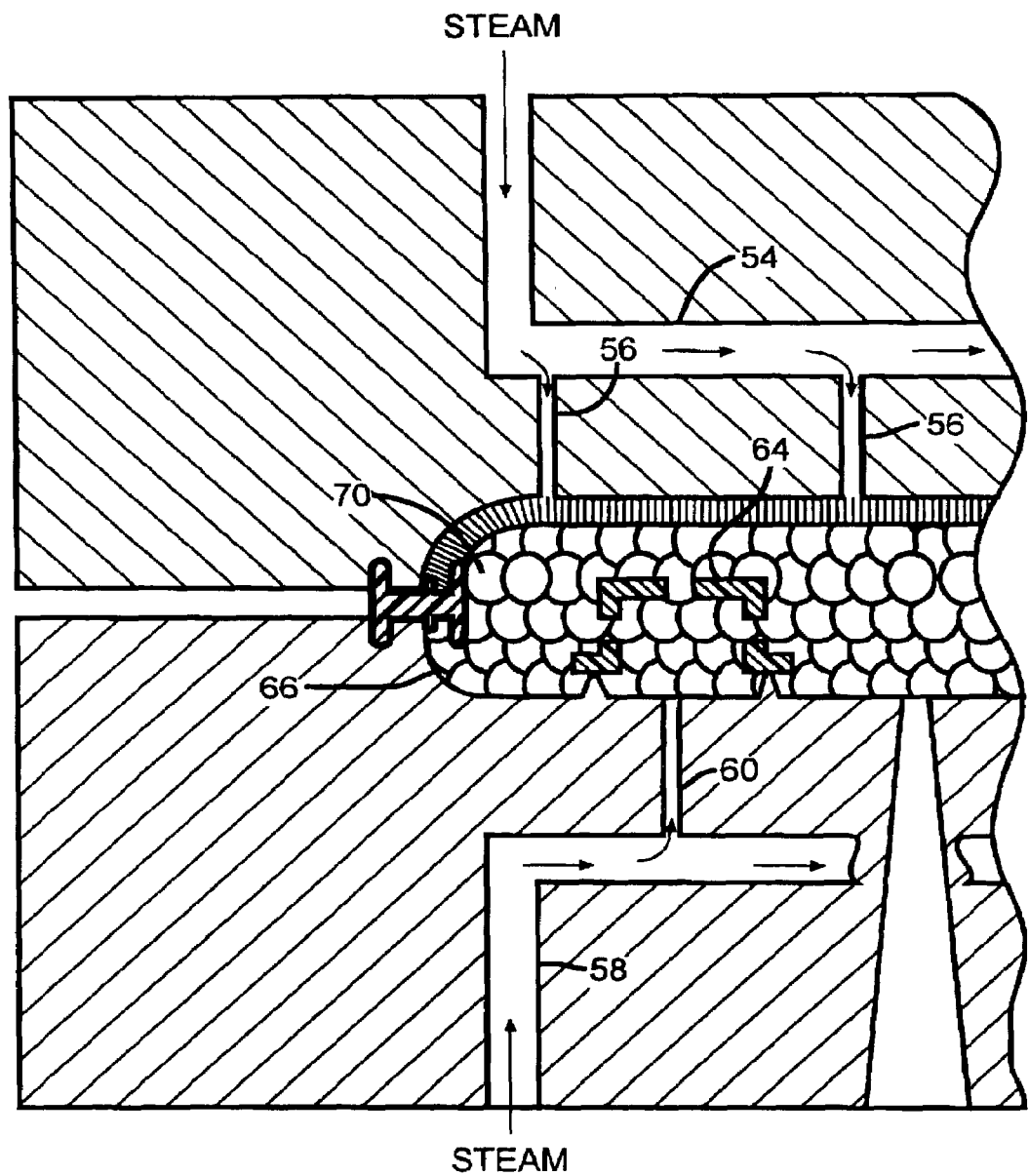
FIG. 5 is a view as in FIG. 4 showing superheated steam being introduced into the mold cavity to melt the exteriors of the beads and thereby bond the beads to each other and to the insert.

After the structural insert 64 and the covering 68 are loaded, the mold is closed by bringing together the upper and lower mold pieces 46 and 50. FIG. 4 shows the mold 44 in a closed position. After the mold is closed, the relatively lightweight moldable material described above is introduced into the mold cavity so that the material surrounds the insert and fills the cavity. FIG. 4 shows beads 70 of expanded polypropylene injected into the mold cavity 66 so that they surround the insert 64 and fill the cavity. The injected beads of expanded polypropylene are heated to cause the beads to swell and to melt the exteriors of the beads, typically by use of a steam chest mold process in which superheated steam is injected into the mold cavity. FIG. 5 shows superheated steam being injected through the upper steam input lines 54 and steam ports 56, and through the lower steam input lines 58 and steam ports 60, into the mold cavity 66 filled with the beads 70 of expanded polypropylene. As shown in the figure, the steam is preferably injected into the cavity from both sides of the mold in a cross-current configuration, but the steam could also be introduced from only one side or the other of the mold.

After the moldable material has been introduced into the mold cavity and has been at least partially melted, the moldable material is allowed to harden to form the load floor. The moldable material is typically hardened by cooling. In the case of the expanded polypropylene beads 70, when the exteriors of the beads harden, the beads are bonded to each other, encapsulating the structural insert 64 and forming a mechanical, and in some cases chemical, bond through the holes 32 in the insert to produce a very strong, integral structure. After the moldable material has hardened, the mold is opened and the load floor is removed from the mold.

Molding processes for other types of moldable materials, such as polymer foams, are well known to persons of ordinary skill in the art.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

What is claimed is:

1. A vehicle load floor comprising:
   a load floor positioned within the vehicle in a generally horizontal orientation, said load floor including:
   a molded floor body having a predetermined shape;
   a rigid skeleton embedded entirely within molded material of said body, said skeleton defined by a frame having a configuration generally corresponding to said predetermined shape, and a plurality of spaced apart beams extending in said frame, wherein said skeleton is configured so that the moldable material can flow substantially uninterrupted through and/or around the skeleton to lock the moldable material to the skeleton; and
   a covering material located on an upwardly facing surface of said floor body.

2. The vehicle load floor according to claim 1, wherein said skeleton includes a plurality of holes therethrough such that portions of said body extend through said holes to lock the moldable material to said skeleton.

3. The vehicle load floor according to claim 1, wherein said covering material is carpet.

4. The vehicle load floor according to claim 1, wherein said covering material is molded onto said body.

5. The vehicle load floor according to claim 1, wherein said frame is formed from a plurality of connected elongated beams forming a rectangular shaped perimeter and a plurality of cross bars extending between said frame.

6. The vehicle load floor according to claim 5, wherein said beams have a cross-sectional shape defined by one of a rectangular shape, a circular shape, a C-shape, a hat shape, an L-shape, an I shape, and a T-shape.

7. The vehicle load floor according to claim 1, wherein said molded floor body is made of a lightweight moldable material including one of expanded polypropylene, expanded polystyrene, expanded polypropylene with added strengtheners, polystyrene/polyphenylene ether foam, polyurethane foam, polystyrene foam, fiberglass materials, glass fiber-reinforced polypropylene, and treated reclaimed cellulose.

* * * * *